United States Patent
Go

(10) Patent No.: US 7,501,057 B1
(45) Date of Patent: Mar. 10, 2009

(54) DETACHABLE ROTATIONAL FILTER SUPPORTER

(75) Inventor: Jung-Kyou Go, Seoul (KR)

(73) Assignee: Altwelltech, Inc., Daejeon (KR)

( * ) Notice: Subject to any disclaimer, the term of this patent is extended or adjusted under 35 U.S.C. 154(b) by 0 days.

(21) Appl. No.: 12/120,942

(22) Filed: May 15, 2008

(30) Foreign Application Priority Data

Jan. 28, 2008 (KR) .................. 10-2008-0008557

(51) Int. Cl.
*B01D 27/08* (2006.01)
*B01D 35/30* (2006.01)
*B01D 35/153* (2006.01)
*B01D 35/157* (2006.01)

(52) U.S. Cl. ............... 210/232; 210/234; 210/235; 210/136; 210/444

(58) Field of Classification Search ............... 210/232, 210/234, 235, 444, 136
See application file for complete search history.

(56) References Cited

U.S. PATENT DOCUMENTS

| 4,985,142 | A | * | 1/1991 | Laycock et al. | 210/130 |
| 5,336,406 | A | * | 8/1994 | Stanford et al. | 210/235 |
| 5,753,107 | A | * | 5/1998 | Magnusson et al. | 210/109 |
| 2003/0168394 | A1 | * | 9/2003 | Gill | 210/249 |
| 2003/0217959 | A1 | * | 11/2003 | Fritze | 210/232 |
| 2006/0000761 | A1 | * | 1/2006 | Choi et al. | 210/232 |

* cited by examiner

*Primary Examiner*—Thomas M Lithgow
(74) *Attorney, Agent, or Firm*—Holme Roberts & Owen LLP

(57) ABSTRACT

A detachable rotational filter supporter is disclosed. The supporter can: release a filter when the housing is rotated; block the flow channel immediately when the filter is separated from the filter supporter; automatically open the closed flow channel when the filter is installed to the filter supporter; and simultaneously hold the filter when the housing is located at the original position. Therefore, the detachable rotational filter supporter allows the filter to be easily separated from and installed to the water purifier and allows general users to simply replace the filters.

12 Claims, 14 Drawing Sheets

DETACHABLE ROTATIONAL FILTER SUPPORTER

BACKGROUND OF THE INVENTION

1. Field of the Invention

The present invention relates to supporters attached to a water purifier, and more particularly, to a detachable rotational filter supporter that can hold or release a filter through a rotational operation and that can automatically open or close the flow channel when the filter is separated from or installed to a water purifier.

2. Description of the Related Art

In recent years, as a result of water pollution, consumers increasingly mistrust tap water cleanliness and thus usually drink tap water treated by water purifiers or bottled water.

In general, a water purifier is configured to include: at least one or more filters for filtering foreign materials contained in unfiltered water that flows thereinto through an inflow part, and for discharging purified water; and an outflow part for discharging the purified water to the outside of a conventional purification system.

When the filters of the water purification system perform a purifying operation for a certain amount of water or for a certain period of time, they filter and accumulate foreign material which reduce their filtering ability and as such must be replaced.

In order to replace filters in the conventional purification system, the filters and their supporters must be coupled to each other by male and female screws. Hoses and fitting, which couple between filters or between filters and supporters, must be separated from each other by using additional tools. Also, unfiltered water must be directly blocked by an unfiltered-water blocking device and then the filters are replaced. After that, the unfiltered-water blocking device is controlled to allow unfiltered water to flow therein. Therefore, replacement of the conventional purification system is complicated and inefficient.

Furthermore, it is difficult or even impossible to assemble the conventional purification system when it is installed in a relatively small space. And even when the conventional purification system is installed in a small space, its filters cannot be easily replaced due to its coupling structure. That is, the filters can only be replaced after the fittings are removed by additional tools. Therefore, the filter replacement of the conventional purification system is complicated and inefficient. Also, since it is difficult for general users to replace the filters of the conventional purification system themselves, users must ask the manufacturers or agent and pay a service fee to have the filters replaced.

SUMMARY OF THE INVENTION

The present invention solves the above problems, and provides a detachable rotational filter supporter that can: release a filter when the housing of the filter supporter is rotated; block the flow channel immediately when the filter is separated from the filter supporter; automatically open the closed flow channel when the filter is installed to the filter supporter; and simultaneously hold the filter when the housing is located at the original position.

In accordance with an exemplary embodiment of the present invention, the present invention provides a detachable rotational filter supporter including: a housing with a receiving hole 11 in which a neck of a filter is placed; an inflow part whose inlet is formed at one side of the housing and whose outlet is formed to communicate with the receiving hole, wherein the inflow part includes a narrow portion of a flow channel at one side of the inflow part, so that the inlet has a larger diameter than the outlet; an outflow part whose outlet is formed at another side of the housing 10 and whose inlet is communicate with the receiving hole; a base installed to the housing in such a way to form a receiving space in the lower portion of the housing, wherein the base forms a through-hole whose axis is the same as the receiving hole; a pair of hinges each of which includes a flow-hole therein, wherein the pair of hinges are fixed to a inner wall of a water purifier, and inserted into the inlet of the inflow part and the outlet of the outflow part so that the inflow part and the outflow part can communicate with each other through their flow-holes, in which the pair of hinges are rotatable with respect to the axis established by the inflow part and the outflow part; a pair of locking parts slidably installed to the receiving space, each of which forms: an arc portion on a facing side and an thin plate at the opposite side of the facing side, which is protrudent to the opposite outside of the housing; at least two or more compression springs installed between the pair of locking parts for pushing the pair of locking parts to the outside; a protrusion protrudently formed from each hinge so that the protrusion can contact the thin plate of the locking part, wherein the protrusion assists the arc portion to contact the neck of the filter and to hole the filter when the protrusion contacts the thin plate; and a check valve installed to one side of the inflow part for opening or closing the flow channel of the inflow part when the filter is installed to or separated from the water purifier.

BRIEF DESCRIPTION OF THE DRAWINGS

The features and advantages of the present invention will be more apparent from the following detailed description in conjunction with the accompanying drawings, in which.

BRIEF DESCRIPTION OF SYMBOLS IN THE DRAWINGS

Figure 1:
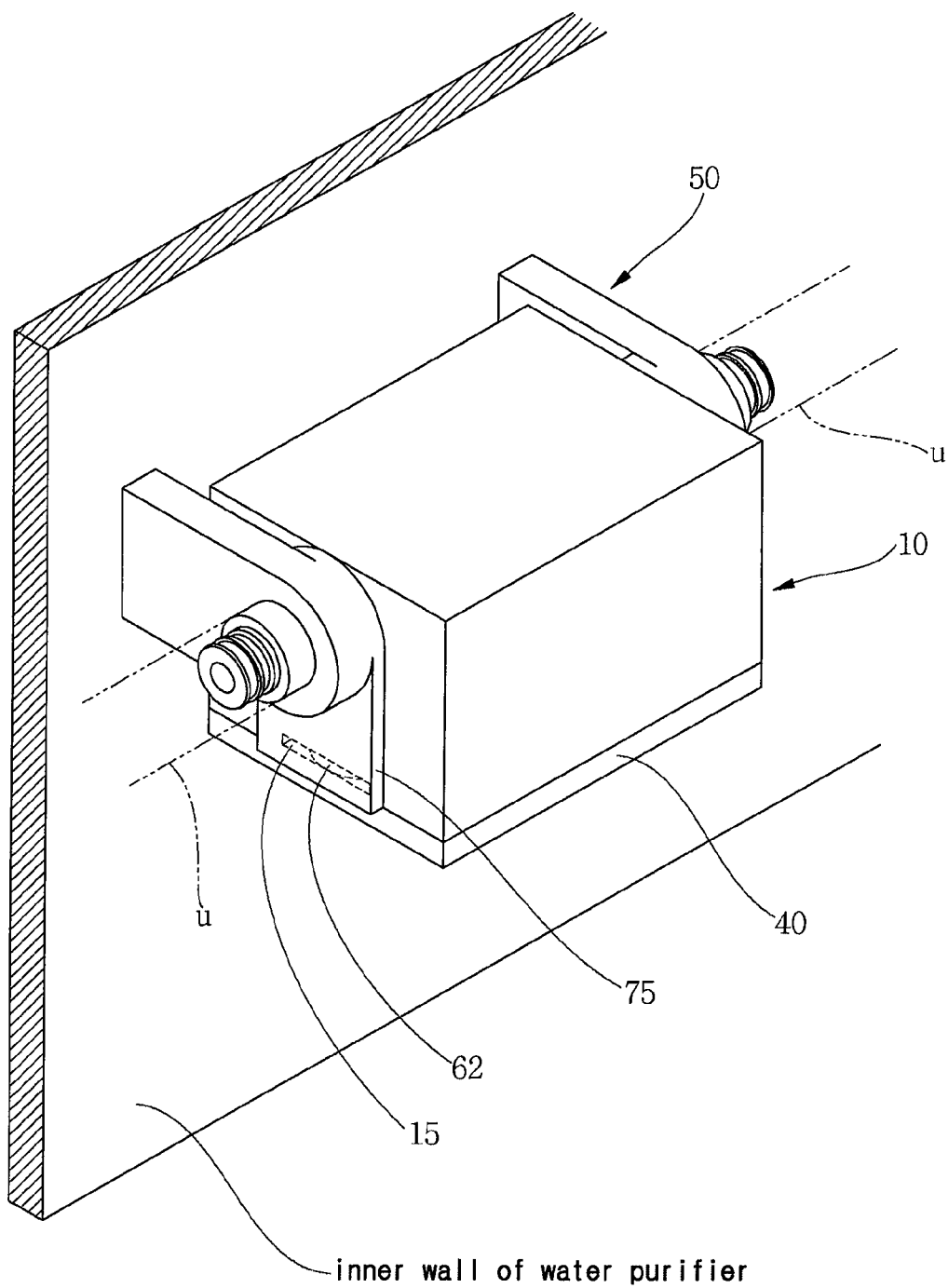
FIG. 1 is a perspective view depicting a detachable rotational filter supporter according to the present invention.

10: housing
11: receiving hole
14: receiving space
20: inflow part
21: narrow portion of a flow channel
30: outflow part
31: flow channel enlarging part
40: base
50: hinge
60: locking part
61: arc portion
62: thin plate
70: compression spring
75: protrusion
80: check valve
87: receiving portion
89: receiving region
90: filter
96: locking groove
100: backward flow check valve
U: flow pipe

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 2:
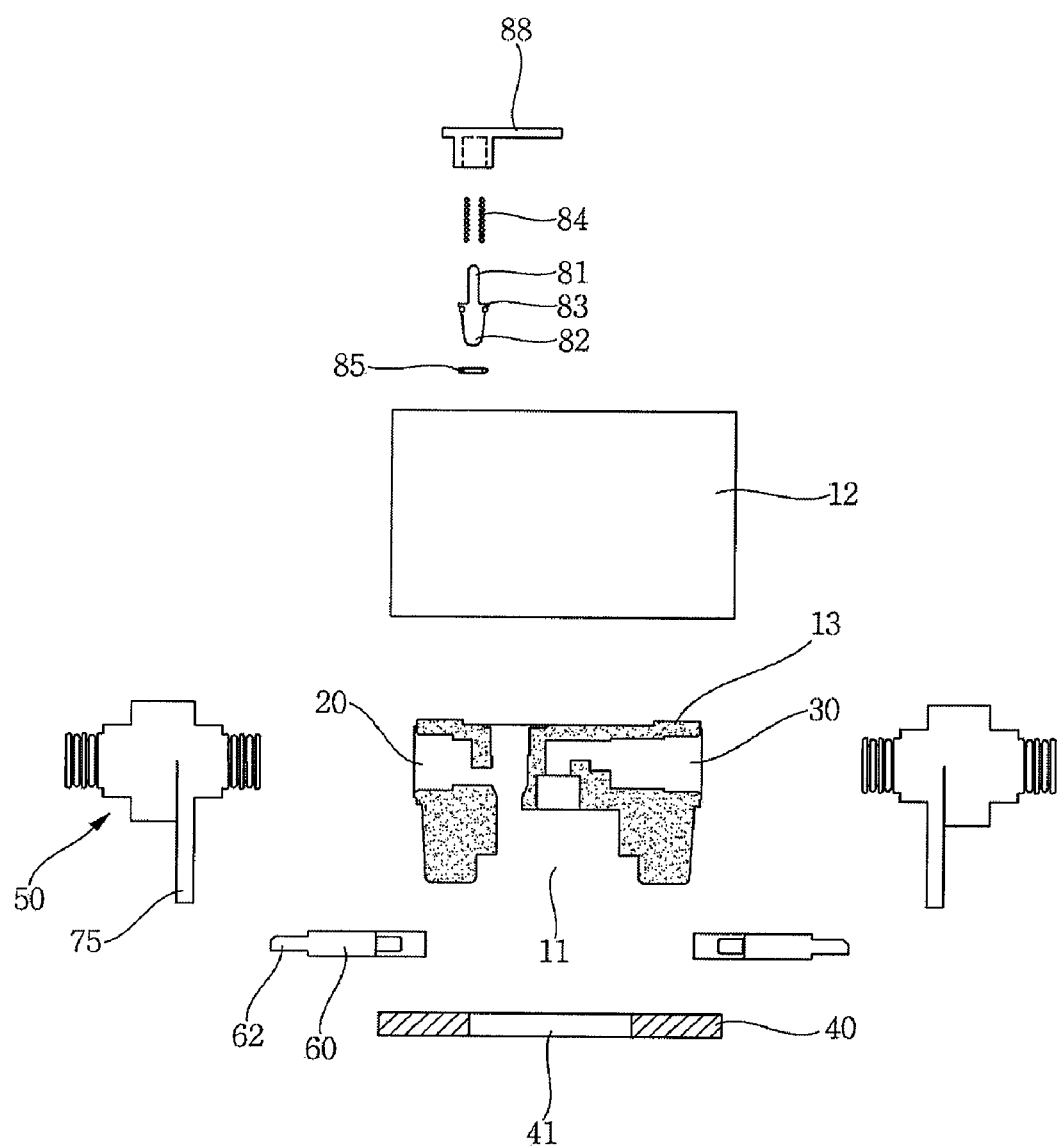
FIG. 2 is a disassembled view depicting a detachable rotational filter supporter according to the present invention.
Figure 3:
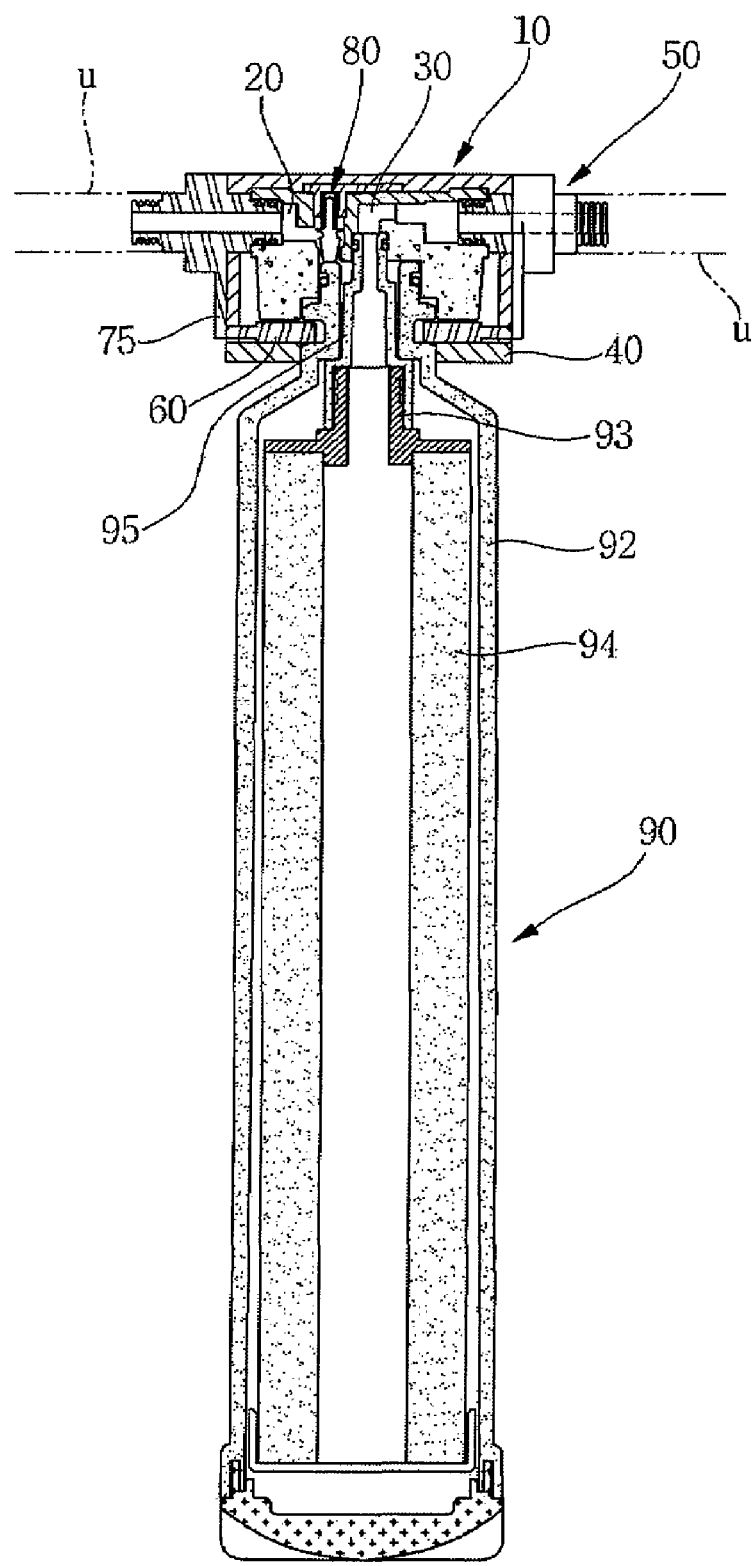
FIG. 3 is a front view depicting a detachable rotational filter supporter according to the present invention.
Figure 4:
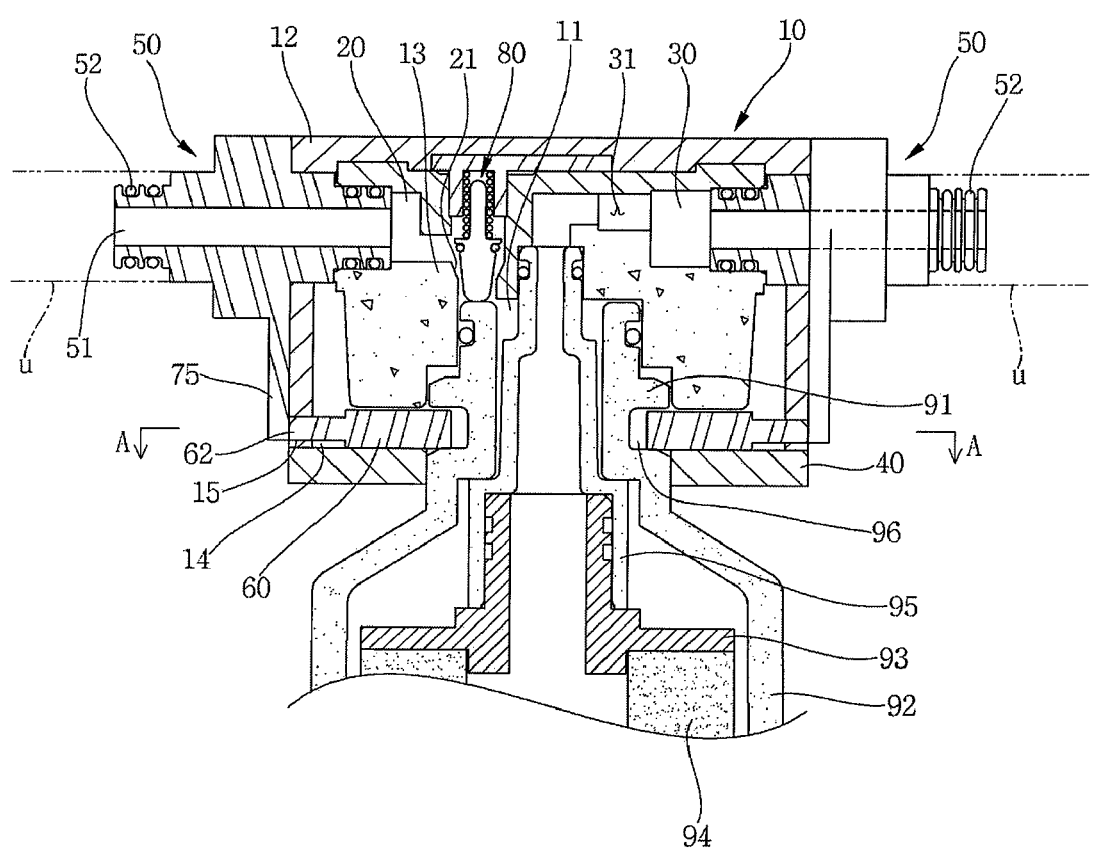
FIG. 4 is a partially enlarged view of FIG. 3.
Figure 5:
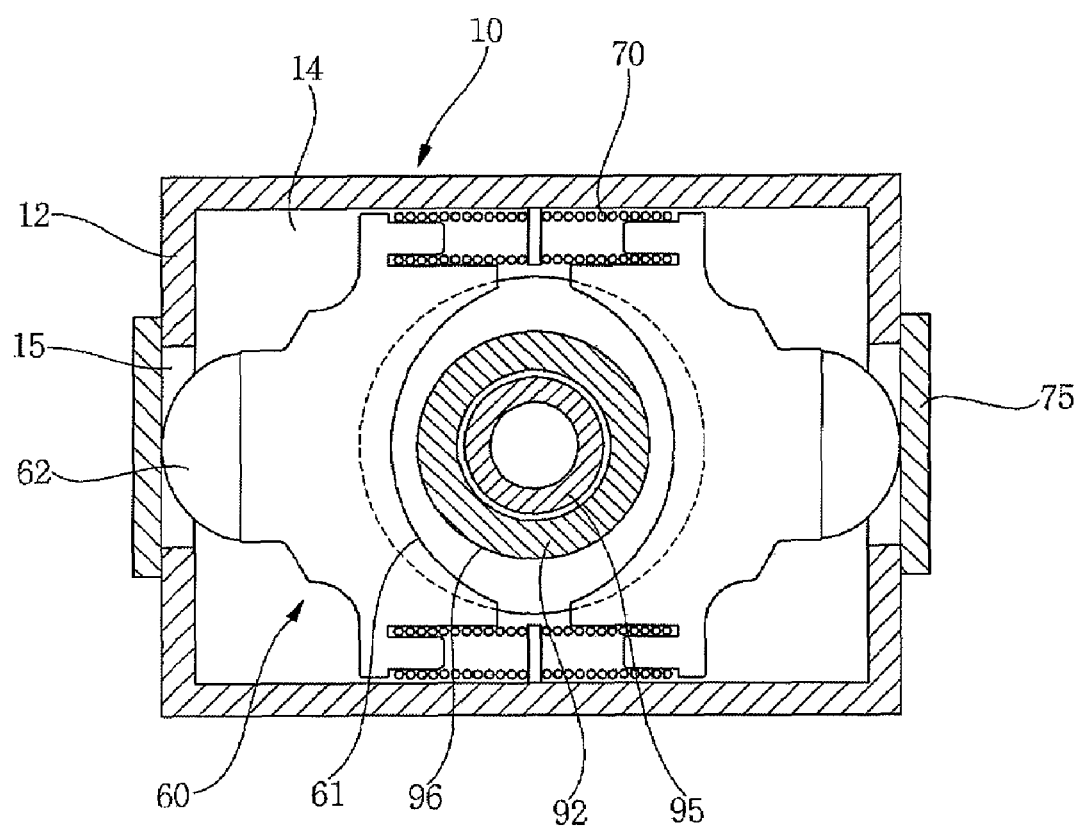
FIG. 5 is a cross-sectional view, taken along line A-A, in FIG. 4.

FIG. 1 is a perspective view depicting a detachable rotational filter supporter according to the present invention. FIG. 2 is a disassembled view depicting a detachable rotational filter supporter according to the present invention. FIG. 3 is a front view depicting a detachable rotational filter supporter according to the present invention. FIG. 4 is a partially enlarged view of FIG. 3. FIG. 5 is a cross-sectional view, taken along line A-A, in FIG. 4.

As shown in FIG. 1 to FIG. 5, the detachable rotational filter supporter includes a housing 10, an inflow part 20, an outflow part 30, a base 40, hinges 50, a locking part 60, a compression spring 70, a protrusion 75, and a check valve 80.

The housing 10 forms a receiving hole 11 therein, in which a neck portion of a filter 90 is placed. More specifically, the housing 10 is configured to include an outer body 12 and an inner body 13, so that the check valve 80 can be installed therein. The inner body 13 forms the receiving hole 11 therein, in which a neck portion of a filter 90 is place. The housing 10 is pivotally installed with respect to the hinge 50.

The inflow part 20 is configured in such a way that: its one end (or an inlet) is formed at one side of the outer body 12 to communicate with the outside and to receive unfiltered water; and its opposite end (or an outlet) is formed to communicate with the receiving hole 11. The inflow part 20 includes a narrow portion 21 of a flow channel at one side thereof, so that the inlet has a larger diameter than the outlet.

Figure 6:
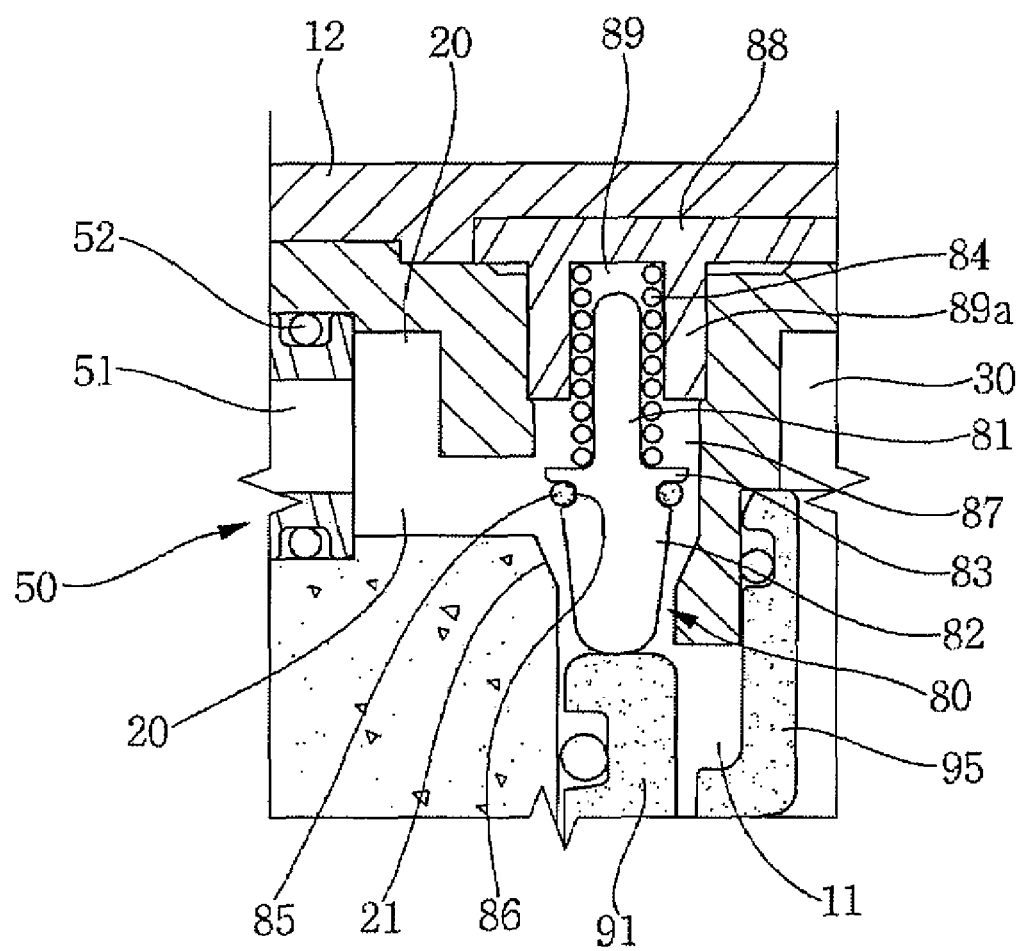
FIG. 6 is an enlarged view depicting a narrow part of a flow channel depicted in FIG. 4.
Figure 7:
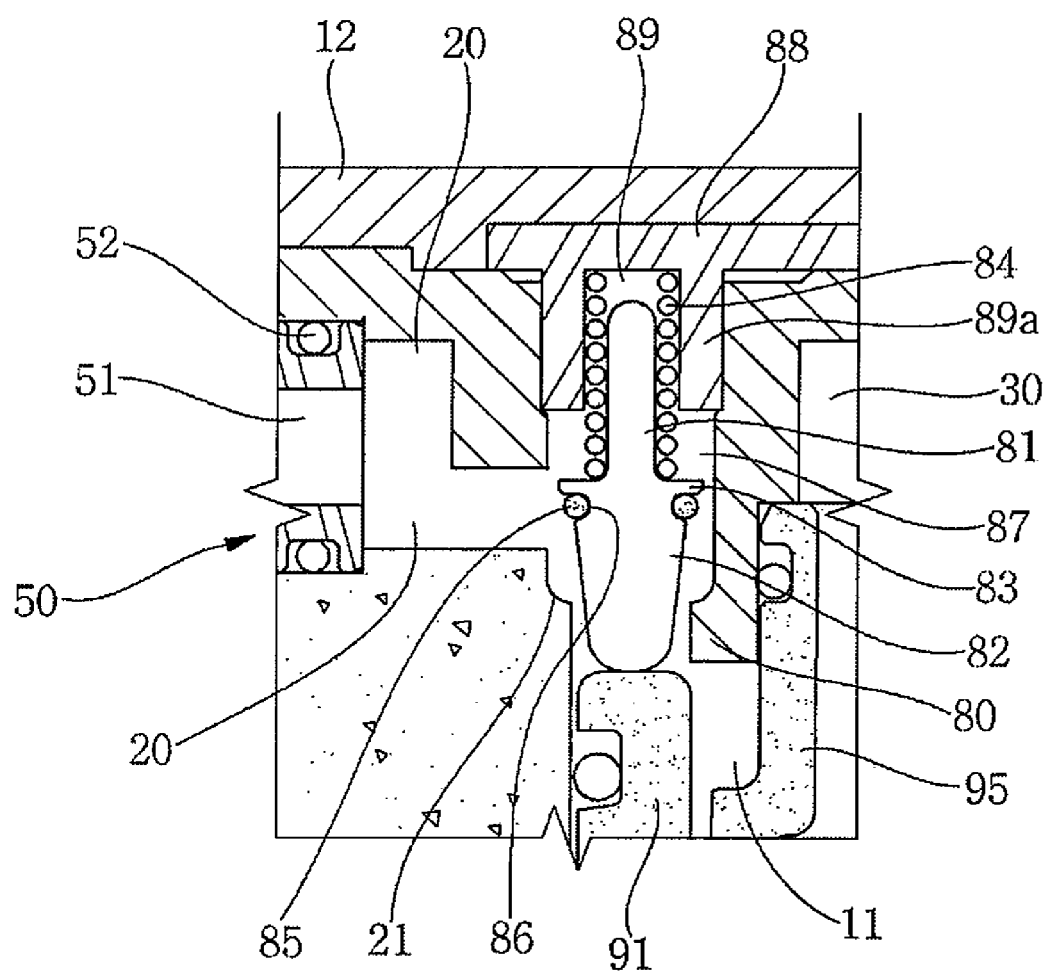
FIG. 7 is an enlarged view depicting another embodiment of a narrow part of a flow channel depicted in FIG. 4.

The inlet 20 serves to guide unfiltered water to the filter 90. The narrow portion 21 of a flow channel can be formed as a sloping surface, as shown in FIG. 6. Also, the narrow portion 21 can be formed as a round shape, as shown in FIG. 7.

The outflow part 30 is configured in such a way that: its outlet for discharging water, purified through the filter 90, is formed at another side of the outer body 12 of the housing 10; and its inlet for receiving purified water from the filter is formed in the inner body 13 of the housing 10 so as to communicate with the receiving hole 11. The outflow part 30 serves to discharge water purified through the filter 90.

As shown in FIG. 3, the filter 90 is configured to include: an outer tube-type boy 92, shape as a cylindrical form, with a neck 91; an inner tube-type body 93 installed in the cylindrical outer body 92, forming a first flow channel communicated with the inflow part 20, in which the inner tube-type body 93 forms a second flow channel communicated with the outflow part 30 therein; a filter member 94 installed in the flow channel of the inner tube-type body 93 for purifying unfiltered water that flows in through the inflow part 20; and a filter cap 95 whose outer portion is communicated with the inflow part 20 and whose inner portion is communicated with the outflow part 30, in which the filter cap 95 is installed to the upper end of the inner tube-type body 93, dividing the neck 91 of the outer tube-type body 92 into an outer portion and inner portion.

It is preferable that the neck 91 of the outer tube-type body 92 forms a locking groove at the outer periphery thereof, to which a locking part 60 is fitted.

The filter member 94 is made of any one of a carbon block filter, a bamboo block filter, a π-ceramic filter, and an ultra filtration filter, or made of the combination of two or more of the filters listed above.

Since the filter 90 is configured to include well-known elements, its detailed description will be omitted in the following.

The base 40 is installed to the housing 10 in such a way as to form a receiving space 14 in the bottom of the housing 10, i.e., in the lower portion of the housing 10. The base 40 forms a through-hole 41, whose axis is the same as the receiving hole 11, for allowing the neck 91 of the outer tube-type body 92 to pass through.

The receiving space 14 allows for the installation of the locking part 60 so that the locking part 60 can slidably move in the receiving space 14. Therefore, the receiving space 14 is communicated with the receiving hole 11. Here, the locking part 60 holds the neck 91 of the filter 90 received in the receiving hole 11.

The hinges 50 form a pair and are installed to both the inflow part 20 and outflow part 30, respectively. The respective hinges 50 form a flow-hole 51 therein. The hinges 50 are inserted into the inlet of the inflow part 20 and into the outlet of the outflow part 30, respectively, so that the inflow part 20 can be communicated with the outflow part 30 through their flow holes 51. The pair of hinges 50 is rotatable with respect to the axis established by the inflow part 20 and the outflow part 30. Also, one side of the respective hinges 50 is fixed to the inner wall of the water purifier.

Also, opposite sides of the hinges 50, which are located opposite the inflow part 20 and outflow part 30, are each connected to U-shaped flow pipes installed into the water purifier.

It is preferable that a first O-ring 52 is inserted between the hinge 50 and the housing 10 to prevent water leakage. More preferably, the number of the first O-ring 52 should be at least one or more.

Figure 8:
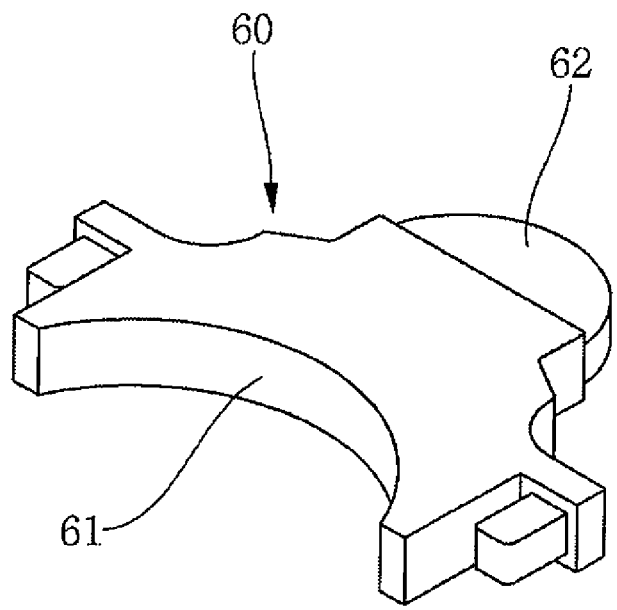
FIG. 8 is a perspective view depicting a locking part of a detachable rotational filter supporter according to the present invention.

The locking parts 60 form a pair, and are slidably installed to the receiving space 14 horizontally. As shown in FIG. 8, each locking part 60 forms: an arc portion 61 for holding the neck 91 of the outer tube-type body 92 of the filter 90 on one side (i.e., a facing side) thereof; and a thin plate 62 at the opposite side thereof, which is protrudent to the opposite outside.

The arc portion 61 is formed to receive the locking groove 96 formed at a portion of the neck 91 of the outer tube-type body 92 of the filter 90.

Figure 9:
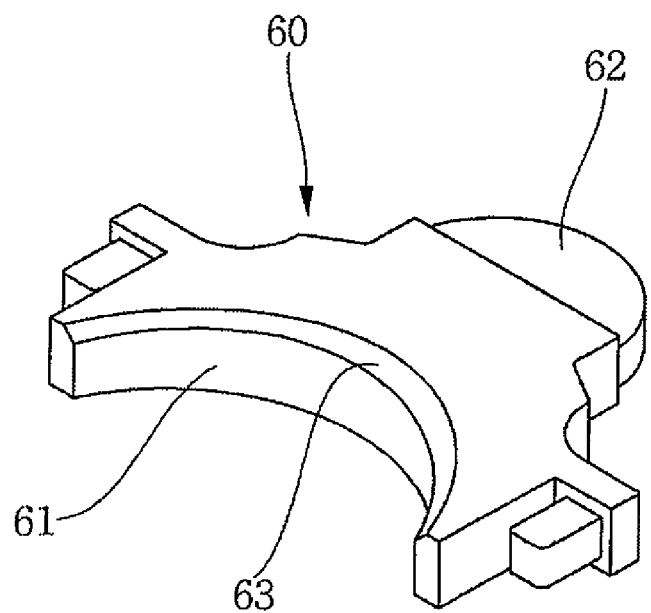
FIG. 9 is a perspective view depicting another embodiment of a locking part of a detachable rotational filter supporter.

As shown in FIG. 9, it is preferable that the locking part 60 includes a chamfered portion 63 formed as the upper edge of the arc portion 61 is chamfered, so that the art portion 61 can be received smoothly by the locking groove of the filter 90.

Also, it is preferable that the thin plate 62 contacting the protrusion 75 is formed to be semicircular at its free end.

It is preferable that the outer tube-type body 12 of the housing 10 includes a through-hole 15 at its both sides, through which the thin plate 62 passes.

When the thin plate 62 of the locking part 60 is located within the housing 10, the arc portion 61 holds the filter 90. On the contrary, when the locking part 60 is slid by the compression spring 70 and thus the thin plate 62 is exposed to the outside from the housing 10, the arc portion 61 releases the filter 90.

At least two or more compression springs 70 are installed between the pair of locking parts 60 so as to elastically push the locking parts 60 to the outside.

The protrusion 75 is protrudently formed from the hinge 50. When the protrusion 75 contacts the thin plate 62 of the locking part 60, the arc portion 61 contacts the neck 91 of the filter 90, so that it can be received in the locking groove 96 formed at the portion of neck 91 to hold the filter 90. When the housing 10 is rotated, the protrusion 75 is released from the thin plate 62.

The check valve 80 is installed to one side of the inflow part 20. The check valve 80 opens or closes the flow channel of the inflow part 20 when the filter 90 is installed to or separated from the water purifier.

As shown in FIG. 6 and FIG. 7, the check valve 80 is configured in such a way that: a first shaft 81 is located at one side of the narrow portion 21 of a flow channel; a first head 82 is formed at one end of the first shaft 81, and installed to the narrow portion 21 of a flow channel, so that the opposite end of the first head 82 is located at the receiving hole 11, contacting the upper surface of the neck 91 of the outer tube-type body 92, received in the receiving hole 11, and the opposite end of the first head 82 is placed within the inflow part 20; a block plate 83 is formed between the first head 82 and the first shaft 81, and closely contacts the narrow portion 21 of a flow channel to close the flow channel of the inflow part 20 when the opposite end of the first head 82 is located at the receiving hole 11; and a first spring 84 whose one end closely contacts the block plate 83 and whose opposite end closely contacts the flow channel, so as to elastically and constantly push the block plate 83.

When a portion of the neck 91 of the filter 90 is located at the receiving hole 11 of the housing 10, its upper surface contacts the first head 82, so that the opposite end of the first head 82 is located within the inflow part 20 and the block plate 83 is separated from the narrow portion 21 of a flow channel, thereby opening the inflow part 20. When the filter 90 is separated from the water purifier, the first spring 84 closely joins the block plate 83 and the narrow portion 21 of a flow channel, thereby closing the inflow part 20.

It is preferable that a second O-ring 85 is inserted between the first head 82 and the block plate 83 so as to enhance water tightness when the check valve 80 closes the flow channel of the inflow part 20.

The second O-ring 85 is placed in a groove 86 formed between the first head 82 and the block plate 83.

The inflow part 20 is formed as an L-shape so that the check valve 80 can be easily installed to the inflow part 20. It is preferable to further include: a receiving portion 87 formed at a bent part that is positioned in the same direction as a vertical part, in which the receiving portion 87 is communicated with the surface of the inner body 13; and a plate 88, installed to the surface of the inner body 13, for closing one side of the receiving portion.

It is preferable to further include a protrusion part 89a protrudent from one side of the plate 88. The protrusion part 89a is placed in the receiving portion 87. The protrusion part 89a forms a receiving region therein to receive the first spring 84 and the first shaft 81 installed in the receiving portion 87.

The outflow part 30 can be configured to include a flow channel enlarging part 31 at its one end, so that the inlet can be smaller in diameter than the outlet. It is preferable that the flow channel enlarging part 31 is formed to have a step, so that a backward flow check valve 100, which will be described later, can be easily installed.

Figure 10:
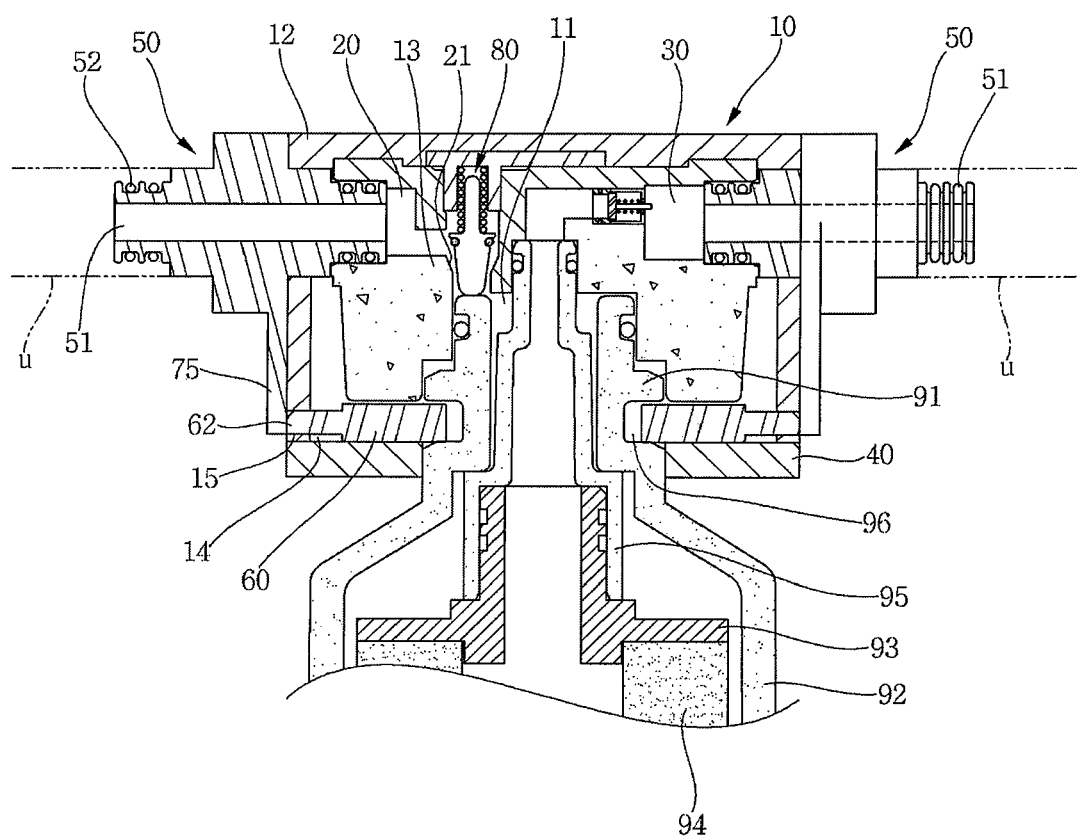
FIG. 10 is a perspective view depicting another embodiment of a detachable rotational filter supporter with a backward flow check valve, according to the present invention.

FIG. 10 is a perspective view depicting another embodiment of a detachable rotational filter supporter with a backward flow check valve, according to the present invention.

As shown in FIG. 10, it is preferable that the detachable rotational filter supporter according to the present invention further includes a backward flow check valve 100 at one side of the outflow part 30. More preferably, the inflow channel enlarging part 31 is formed in the step.

The backward flow check valve 100 minimizes leakage of purified water that remains in the outflow part 30 when the filter 90 is separated from the water purifier.

Figure 11:
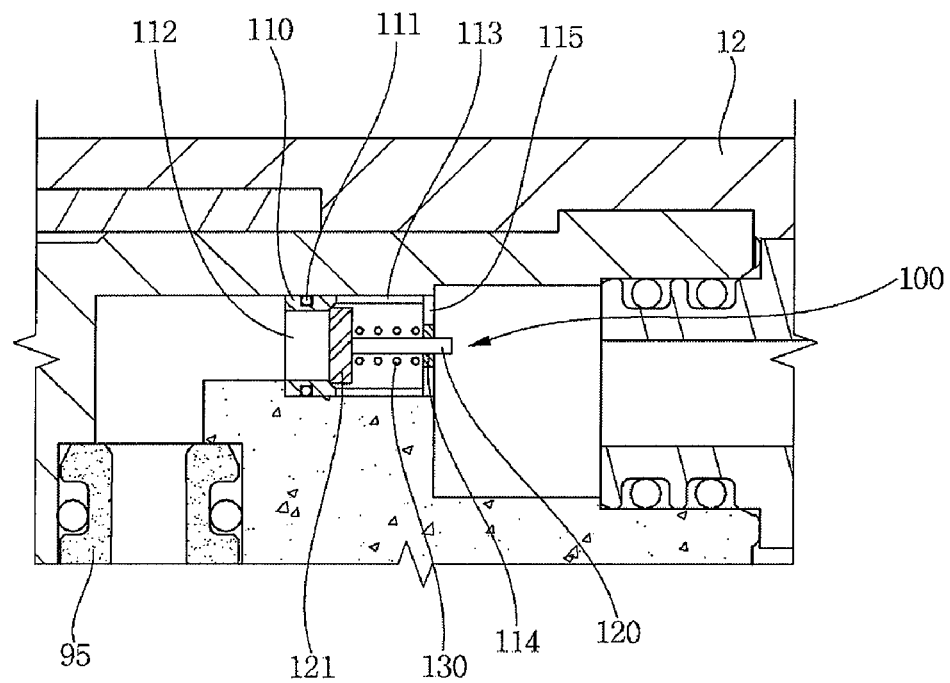
FIG. 11 is a large view depicting a primary part of the detachable rotational filter supporter with a check valve of FIG. 10.
Figure 12:
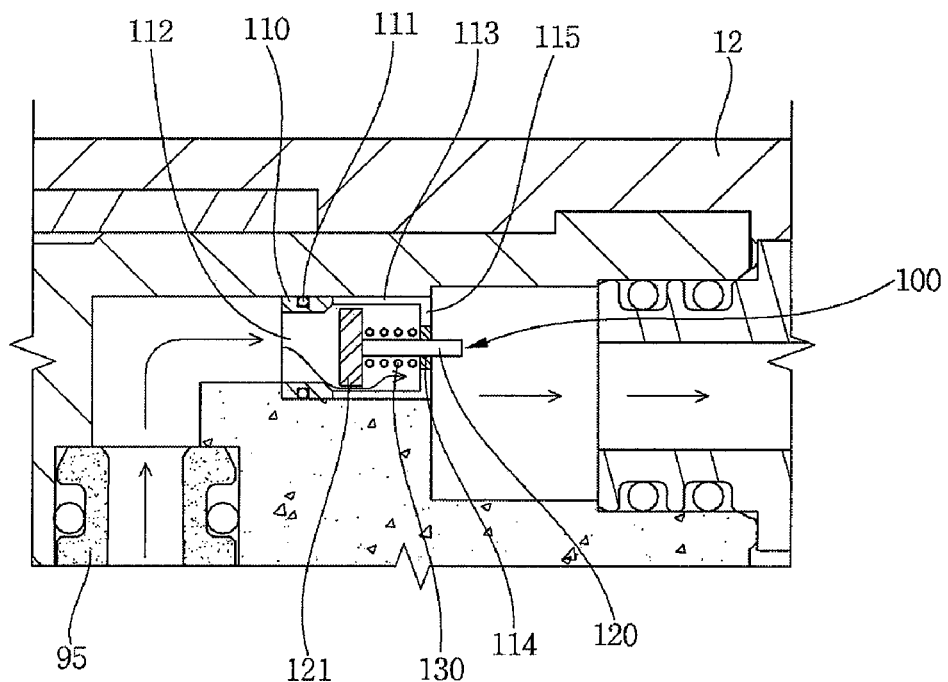
FIG. 12 is a view that explains an operating state of the check valve.

FIG. 11 is a large view depicting a primary part of the detachable rotational filter supporter with a check valve of FIG. 10. FIG. 12 is a view that explains an operating state of the check valve.

As shown in FIG. 11 and FIG. 12, the backward flow check valve 100 is configured to include: a body 110 that is installed to the flow channel enlarging part 31, includes an O-ring 111 at the periphery thereof, forms a hollow cavity 112 therein, forms a tri-ped 113 at one side thereof, and includes a connecting frame 115 that generates a hole 114 simultaneously when the free ends of the tri-ped 113 are connected thereto; a second shaft 120 slidably installed and extended through the hole 114, wherein the second shaft 120 including, a second head 121 that closely joins its one end with the hollow cavity 112 and closes the hollow cavity 112; and a second spring 130 installed between the second head 121 and the connecting frame 115 for elastically and continuously pushing the second head 121.

That is, as shown in FIG. 12, when purified water is output from the filter 90, the second head 121 is retreated from the hollow cavity 112, overcoming the elastic force of the second spring 130, and is separated from the edge of the periphery forming the hollow cavity 112 by the purified water pressure, thereby opening the outflow part 30. On the contrary, when purified water is blocked, by the elastic force of the second spring 130, the second head 121 is moved to the hollow cavity 112 and contacts the edge of the periphery forming the hollow cavity 112, thereby closing the outflow part 30.

In the following description, the operation of the detachable rotational filter supporter will be explained with reference to figures.

Figure 13:
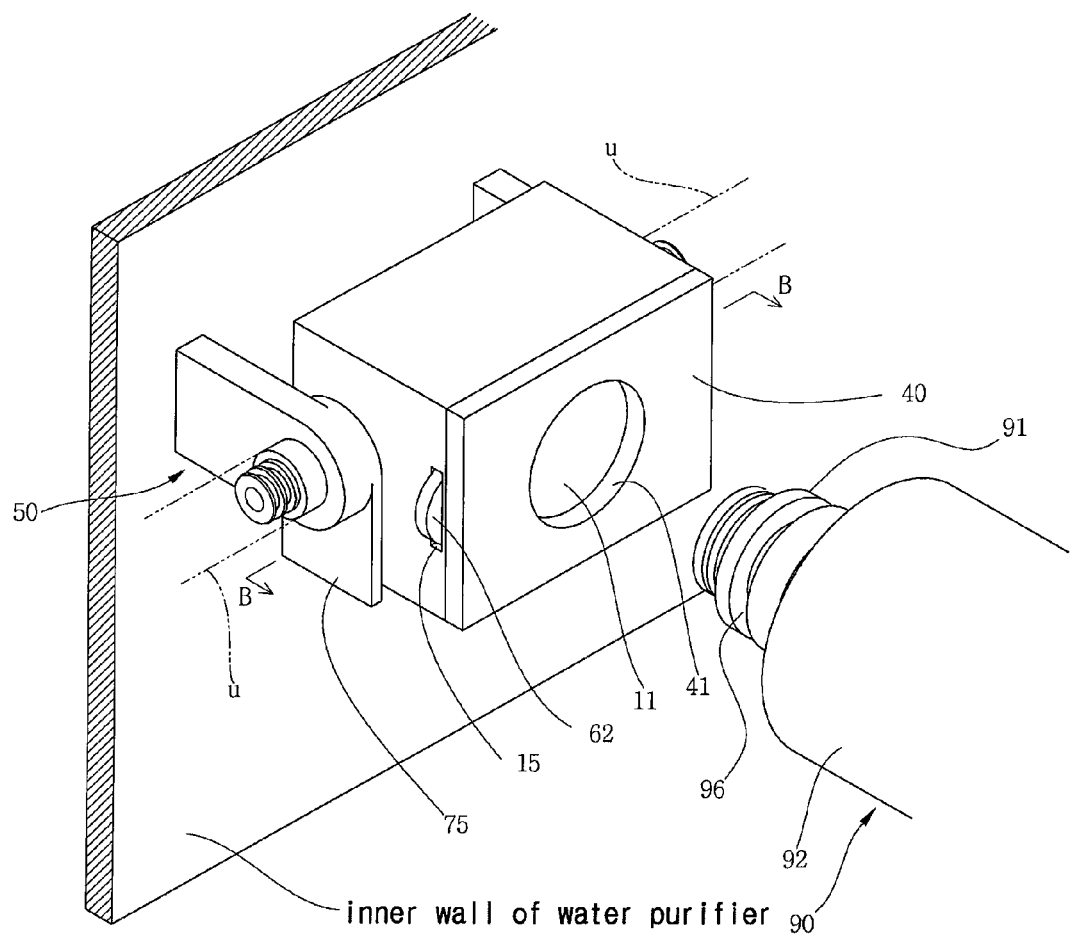
FIG. 13 is a perspective view depicting a state where a filter is separated from a housing of the detachable rotational filter supporter according to the present invention.
Figure 14:
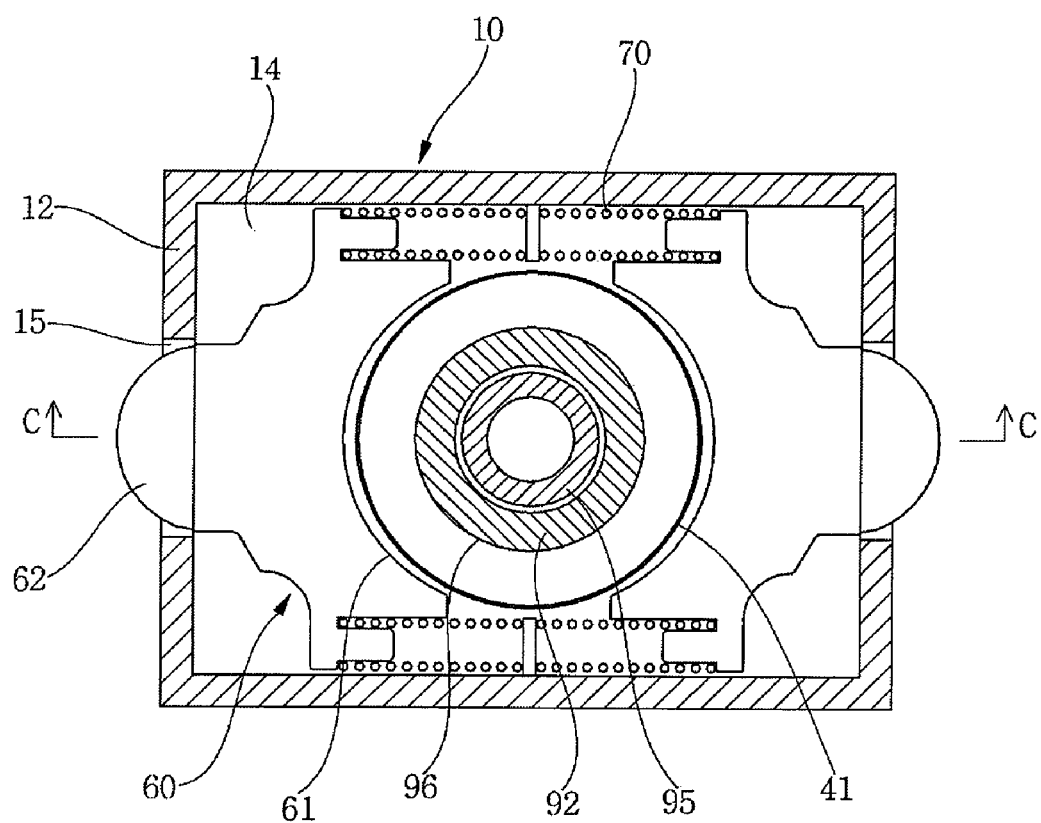
FIG. 14 is a cross-sectional view, taken along line B-B, in FIG. 13.
Figure 15:
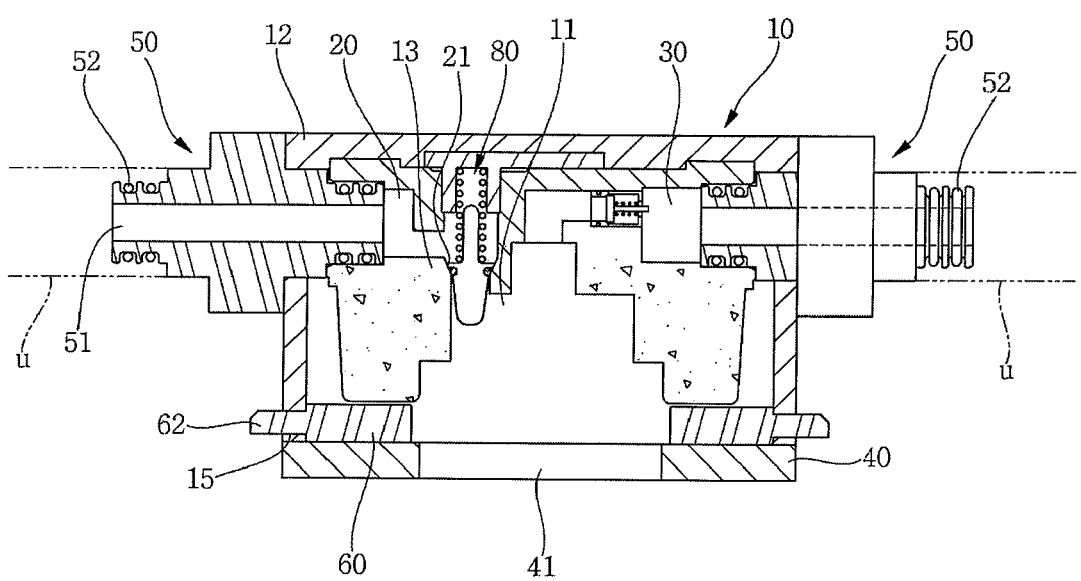
FIG. 15 is a cross-sectional view, taken along line C-C, in FIG. 14.
Figure 16:
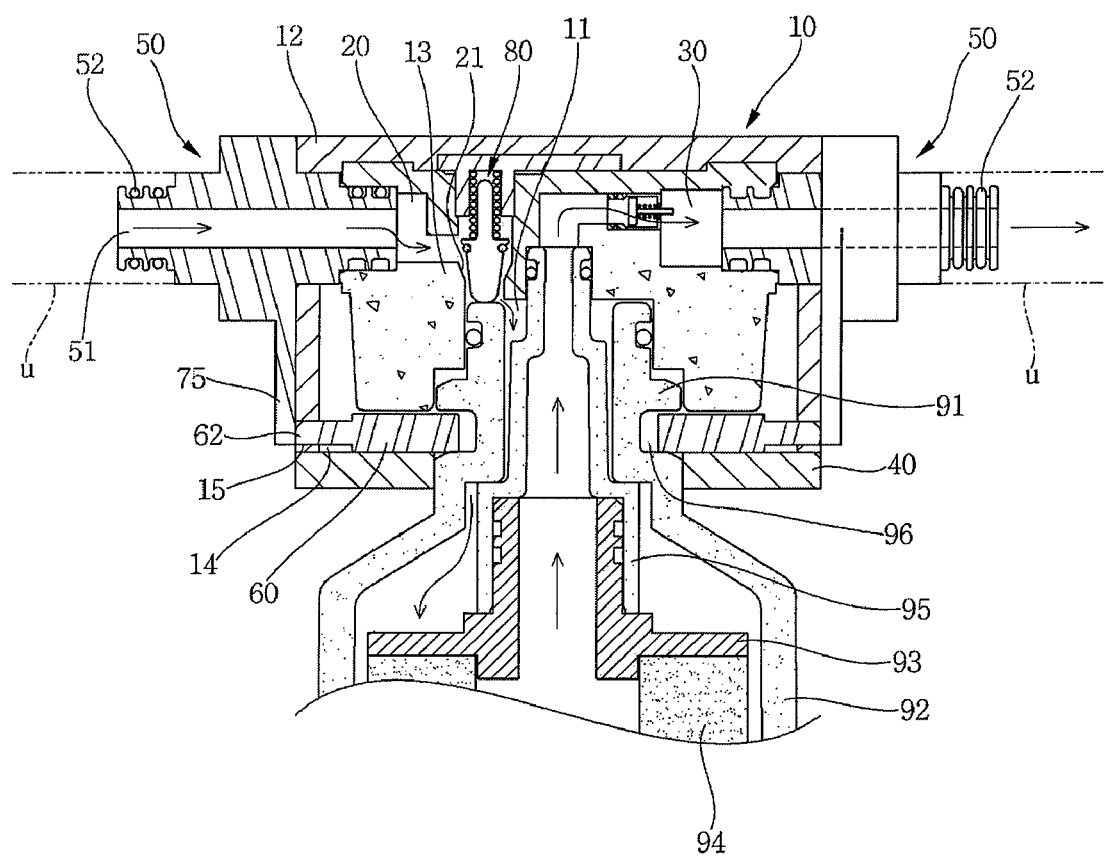
FIG. 16 is a view depicting an operating state of the detachable rotational filter supporter according to the present invention.

FIG. 13 is a perspective view depicting a state where a filter is separated from a housing of the detachable rotational filter supporter according to the present invention. FIG. 14 is a cross-sectional view, taken along line B-B, in FIG. 13. FIG. 15 is a cross-sectional view, taken along line C-C, in FIG. 14. FIG. 16 is a view depicting an operating state of the detachable rotational filter supporter according to the present invention.

The filter 90 to be replaced is separated from a water purifier as follows:

The hosing 10 is rotated with respect to filter 90 or vice versa, as shown in FIG. 13. That is, the housing 10 is rotated with respect to the hinges 50 fixed to the inner wall of the water purifier, because parts of the flow-holes 51 of the hinges 50 are rotatably installed to the inflow part 20 and outflow part 30, respectively, which are located at both sides of the housing 10.

While the housing 10 is rotated, the protrusions 75 formed at the hinges 50 are separated from the thin plates 62 of the locking parts 60.

The locking parts 60 are moved to the outside from the housing 10 by the compression springs 70 installed between the locking parts 60, and then exposed through the through-holes 15 to the outside, as shown in FIG. 14.

The arc portions 61 of the locking parts 60 are separated from the locking grove 96 of the neck 91 of the filter 90, thereby releasing the filter 90.

As a result, the filter 90 is separated from the housing 10.

When the filter 90 is separated from the housing 10, the opposite end of the first head 82 of the check valve 80 contacts to the upper surface of the neck 91 of the filter 90 and becomes located in the receiving hole 11. That is, the second spring 84 pushes the block plate 83, so that the block plate 83 closely contacts the narrow portion 21 of a flow channel and closes the inflow part 20. Also, the second O-ring 85, placed in a groove 86 formed between the first head 82 and the block plate 83, contacts the narrow portion 21 of a flow channel to enhance water tightness.

When the inflow part 20 is blocked, the second head 121 closes the hollow cavity 112 by the operation of the second spring 130 of the backward flow check valve 100 and thus closes the outflow part 30.

Now, a new filter 90 is installed to the water purifier as follows.

The neck 91 of the new filter 90 is inserted into the receiving hole 11. The upper surface of the neck 91 contacts the opposite end of the first head 82 and thus the first head 82 is moved into the inflow part 20.

While the filter 90 is inserted, the block plate 83 having contacted the narrow portion 21 of a flow channel of the inflow part 20 is separated from the narrow portion 21 so that the flow channel of the inflow part 20 is opened.

When the inflow part 20 is opened, unfiltered water passes through the new filter 90 to generate purified water. When the purified water flows into the outflow part 30, the second head 121 of the backward flow check valve 100 is separated from the hollow cavity 112 by the purified water pressure and thus the outflow part 30 is opened.

After that, the housing 10 is rotated to the original position. The protrusions 75 of the hinges 50 contact the thin plates 62 of the locking parts 60 so that the locking parts 60 are slid into the housing 10. The arc portions 61 of the locking parts 60 are placed into the locking groove 96 of the neck 91 of the new filter 90, so that the new filter 90 can be locked thereto.

As described in the foregoing, the detachable rotational filter supporter according to the present invention allows the filters to be easily separated therefrom in such a way that: the protrusion formed at the hinge is released from the locking part when the housing is rotated; the filter is unlocked when the locking part is moved to the outside by the spring; the check valve blocks the flow channel when the filter begins to be separated from the housing, and allows the filters to be easily installed thereto in such a way that: while the separating order is inversely performed, the flow channel is opened; and the filter can be easily installed thereto when the housing is rotated to the original position.

In addition, the detachable rotational filter supporter according to the present invention allows general users to conveniently replace the filters themselves, since the filters can be easily installed to and separated from the water purifier.

Although exemplary embodiments of the present invention have been described in detail herein above, it should be understood that many variations and modifications of the basic inventive concept herein described, which may appear to those skilled in the art, will still fall within the spirit and scope of the exemplary embodiments of the present invention as defined in the appended claims.

What is claimed is:

1. A detachable rotational filter supporter comprising:
a housing (10) with a receiving hole (11) in which a neck (91) of a filter (90) is placed;
an inflow part (20) whose inlet is formed at one side of the housing (10) and whose outlet is formed to communicate with the receiving hole (11), wherein the inflow part (20) includes a narrow portion (21) of a flow channel at one side of the inflow part (20), so that the inlet has a larger diameter than the outlet;
an outflow part (30) whose outlet is formed at another side of the housing 10 and whose inlet is communicate with the receiving hole (11);
a base (40) installed to the housing (10) in such a way to form a receiving space (14) in the lower portion of the housing (10), wherein the base (40) forms a through-hole (41) whose axis is the same as the receiving hole (11);
a pair of hinges (50) each of which includes a flow-hole (51) therein, wherein the pair of hinges (50) are fixed to a inner wall of a water purifier, and inserted into the inlet of the inflow part (20) and the outlet of the outflow part (30) so that the inflow part (20) and the outflow part (30) can communicate with each other through their flow-holes, in which the pair of hinges (50) are rotatable with respect to the axis established by the inflow part (20) and the outflow part (30);
a pair of locking parts (60) slidably installed to the receiving space (14), each of which forms: an arc portion on a facing side and an thin plate (62) at the opposite side of the facing side, which is protrudent to the opposite outside of the housing (10);
at least two or more compression springs (70) installed between the pair of locking parts (60) for pushing the pair of locking parts (60) to the outside;
a protrusion (75) protrudently formed from each hinge (50) so that the protrusion (75) can contact the thin plate (62) of the locking part (60), wherein the protrusion (75) assists the arc portion (61) to contact the neck (91) of the filter (90) and to hole the filter (90) when the protrusion (75) contacts the thin plate (62); and
a check valve (80) installed to one side of the inflow part (20) for opening or closing the flow channel of the inflow part (20) when the filter (90) is installed to or separated from the water purifier.

2. The detachable rotational filter supporter according to claim 1, wherein the narrow portion (21) of a flow channel is formed as a curved shaped or a sloped shape.

3. The detachable rotational filter supporter according to claim 1, wherein the check valve (80) comprise:
- a first shaft (81) located at one side of the narrow portion (21) of a flow channel;
- a first head (82) that is formed at one end of the first shaft (81), and installed to the narrow portion (21) of a flow channel, so that the opposite end of the first head (82) is located at the receiving hole (11), contacting the filter (90) received in the receiving hole (11), and the opposite end of the first head (82) is placed within the inflow part (20);
- a block plate (83) that is formed between the first head (82) and the first shaft (81), and closely contacts the narrow portion (21) of a flow channel to close the flow channel of the inflow part (20) when the opposite end of the first head (82) is located at the receiving hole (11); and
- a first spring (84) whose one end closely contacts the block plate (83) and whose opposite end closely contacts the flow channel of the inlet part (20), so as to continuously push the block plate (83).

4. The detachable rotational filter supporter according to claim 3, further comprising a second O-ring (85) between the first head (82) and the block plate (83) of the check valve (80).

5. The detachable rotational filter supporter according to claim 1, wherein the arc portion (61) further comprises a chamfered portion (63) in the upper edge of the arc portion (61).

6. The detachable rotational filter supporter according to claim 1, wherein the thin plate (62) of the locking part (60) is formed to be semicircular at the free end thereof.

7. The detachable rotational filter supporter according to claim 1, further comprising a first O-ring (52) between the hinge (50) and the housing (10).

8. The detachable rotational filter supporter according to claim 1, wherein the outflow part (30) further comprises a flow channel enlarging part (31) at the one end thereof, so that the inlet is smaller in diameter than the outlet.

9. The detachable rotational filter supporter according to claim 8, wherein the flow channel enlarging part (31) is formed to have a step.

10. The detachable rotational filter supporter according to claim 1, wherein the outflow part (30) further comprises a backward flow check valve (100) at the one side thereof.

11. The detachable rotational filter supporter according to claim 10, wherein the backward flow check valve (100) is installed to the flow channel enlarging part (31).

12. The detachable rotational filter supporter according to claim 10, wherein the backward flow check valve (100) comprises:
- a body (110) that is installed to the flow channel enlarging part (31), includes an O-ring (111) at the periphery thereof, forms a hollow cavity (112) therein, forms a tri-ped (113) at one side thereof, and includes a connecting frame (115) that generates a hole (114) simultaneously when the free ends of the tri-ped (113) are connected thereto;
- a second shaft (120) slidably installed and extended through the hole (114), wherein the second shaft (120) including a second head (121) that closely joins its one end with the hollow cavity (112) and closes the hollow cavity (112); and
- a second spring (130) installed between the second head (121) and the connecting frame (115) for elastically and continuously pushing the second head (121).

* * * * *

UNITED STATES PATENT AND TRADEMARK OFFICE
CERTIFICATE OF CORRECTION

PATENT NO.         : 7,501,057 B1  
APPLICATION NO. : 12/120942  
DATED              : March 10, 2009  
INVENTOR(S)     : Jung-Kyun Go Page 1 of 1

It is certified that error appears in the above-identified patent and that said Letters Patent is hereby corrected as shown below:

Title page – Should Read –

(75) Inventor: Jung-Kyun Go, Seoul (KR)

Signed and Sealed this

Nineteenth Day of May, 2009

JOHN DOLL  
*Acting Director of the United States Patent and Trademark Office*